United States Patent
Kaufman et al.

(10) Patent No.: US 9,727,378 B2
(45) Date of Patent: Aug. 8, 2017

(54) PERSISTENT UNENROLLMENT FOR DEVICES UNDER MANAGEMENT

(71) Applicant: Microsoft Technology Licensing, LLC, Redmond, WA (US)

(72) Inventors: Peter J. Kaufman, Sammamish, WA (US); Janani Vasudevan, Redmond, WA (US); Richard I. June, Seattle, WA (US); Justin Hou, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 14/699,950

(22) Filed: Apr. 29, 2015

(65) Prior Publication Data

US 2016/0210169 A1    Jul. 21, 2016

Related U.S. Application Data

(60) Provisional application No. 62/106,181, filed on Jan. 21, 2015.

(51) Int. Cl.
| | |
|---|---|
| *G06F 9/46* | (2006.01) |
| *G06F 13/00* | (2006.01) |
| *G06F 9/50* | (2006.01) |
| *H04L 12/24* | (2006.01) |
| *G06Q 10/10* | (2012.01) |

(52) U.S. Cl.
CPC ............. *G06F 9/50* (2013.01); *G06Q 10/10* (2013.01); *H04L 41/20* (2013.01)

(58) Field of Classification Search
None
See application file for complete search history.

(56) References Cited

U.S. PATENT DOCUMENTS

| | | | |
|---|---|---|---|
| 8,095,634 B2 | 1/2012 | Rao | |
| 8,695,058 B2 | 4/2014 | Batchu et al. | |
| 8,745,755 B2 | 6/2014 | Borzycki et al. | |
| 8,924,461 B2 | 12/2014 | Gentile et al. | |
| 2007/0271404 A1* | 11/2007 | Dearth ................. | G06F 13/102 710/302 |
| 2009/0182802 A1 | 7/2009 | Tran et al. | |
| 2011/0252240 A1 | 10/2011 | Freedman et al. | |
| 2012/0226740 A1 | 9/2012 | Nath et al. | |
| 2013/0007245 A1 | 1/2013 | Malik et al. | |
| 2013/0167247 A1 | 6/2013 | Brown et al. | |
| 2014/0282460 A1 | 9/2014 | Cai et al. | |
| 2014/0297840 A1 | 10/2014 | Qureshi | |

OTHER PUBLICATIONS

Second Written Opinion Issued in PCT Application No. PCT/US2016/013981, Mailed Date: May 18, 2016, 6 Pages.
International Search Report and Written Opinion Issued in PCT Application No. PCT/US2016/013771, Mailed Date: Mar. 21, 2016, 11 Pages.

(Continued)

*Primary Examiner* — Bing Zhao
(74) *Attorney, Agent, or Firm* — Perkins Coie LLP

(57) ABSTRACT

A facility for maintaining the state of a managed device is described. The facility receives an indication that the managed device is to be unenrolled from management. In response to receiving the indication, during a first time period, the facility performs a first unenrollment task with respect to the managed device. In response to receiving indication, during a second time period that does not intersect the first time period, performing a second unenrollment task with respect to the managed device that is distinct from the first unenrollment task.

21 Claims, 7 Drawing Sheets

(56) References Cited

OTHER PUBLICATIONS

International Search Report and Written Opinion Issued in PCT Application No. PCT/US2016/013981, Mailed Date: Mar. 14, 2016, 10 Pages.
"Mobile Device Manager—Admin Guide—Device Management," Published on: Sep. 2013 Available at: insidetelepacific.com/support/user-guides/cloud-services/MDM_Device_Management_Admin_Guide.pdf.
"Sophos Mobile Control Administrator guide," Published on: Jul. 2012 Available at: sophos.com/en-us/medialibrary/PDFs/manuals/smc_25_ag_eng_administrator_guide.pdf.
"Windows* Device Management Goes Mobile," Retrieved on: Feb. 12, 2015 Available at: intel.in/content/dam/www/public/us/en/documents/white-papers/mobile-computing-core-processors-atom-windows-management-white-paper.pdf.
"Mobile Device Manager v. 7.3—Admin Guide—APPTIX," Published on: Oct. 14, 2010 Available at: apptix.com/support/mobile/mobile-device-manager-(mdm)/mdm-admin-guide.aspx.
Torres, Elvin., "Mobile Device Management: Unenroll iOS device from service," Retrieved on: Feb. 12, 2015 Available at: ts.yale.edu/how-to/email-and-calendars/yaleconnect/mobile-phones-and-tablets/article-mobile-device-management-unenroll-ios-device-service.
"Transform Your Business with MaaS360 for iOS," Retrieved on: Feb. 12, 2015 Available at: http://www.maas360.com/products/mobile-device-management/apple-ios/.
"Unified Enterprise Mobility Management Solution," Published on: Jun. 2014 Available at: http://www.soti.net/media/142705/SOTI_MobiControl_Brochure_JUN2014.pdf.

* cited by examiner

| conditions | task | completed |
|---|---|---|
| user logged in | delete system-level security policies | yes |
| user logged in; billing submissions fully uploaded | delete user-level security policies | no |
| | delete billing submissions | no |

| task | completed | |
|---|---|---|
| uninstall application A | no | — 701 |
| uninstall application B | no | — 702 |
| delete organization credentials | no | — 703 | task table — 700
711 / 712

FIG. 8

| task | completed | |
|---|---|---|
| uninstall application A | yes | — 801 |
| uninstall application B | no | — 802 |
| delete organization credentials | yes | — 803 | task table — 800
811 / 812

PERSISTENT UNENROLLMENT FOR DEVICES UNDER MANAGEMENT

CROSS-REFERENCE TO RELATED APPLICATION(S)

This application claims the benefit of U.S. provisional patent application No. 62/106,181, entitled "MULTIPLE PHASE UNENROLLMENT FOR DEVICES UNDER MANAGEMENT," filed on Jan. 21, 2015, which is hereby incorporated by reference in its entirety. In ways in which the present application and documents incorporated herein by reference are inconsistent, the present application controls.

TECHNICAL FIELD

The described technology is directed to the field of enterprise device management.

BACKGROUND

An organization such as a company has an interest in maintaining the security and usability of computer systems, smart phones, and other computing devices used by people who work with the organization. Some such organizations employ device management systems, such as the MICROSOFT INTUNE device management system, to assist with the management of such devices.

When a device is enrolled with a device management system, in some cases the device management system establishes a set of resources on the device. These resources can include some that are used in the process of managing the device—such as a device management client, organization-mandated security policies, organization-issued credentials, etc.—as well as some that make the device more usable to one or more users of the device—such as special applications used within the organization, pointers to the organization's data, directories of the organization's users, etc.

When a device is unenrolled from a device management system, the device management system typically seeks to remove at least some of the resources it established on the device, (a) to end the process of managing the device, and/or (b) to reduce or end the device's access to the organization's information.

BRIEF DESCRIPTION OF THE DRAWINGS

FIG. 5 is a table diagram showing sample contents of the task table shown in FIG. 4 at a later point in time.

FIG. 7 is a table diagram showing sample contents of a task table used in some examples by the facility to specify the resource removal tasks to be performed as part of unenrolling a particular device from management as part of the second approach.

FIG. 8 is a table diagram showing sample contents of the task table shown in FIG. 7 at a later point in time.

SUMMARY

Figure 1:
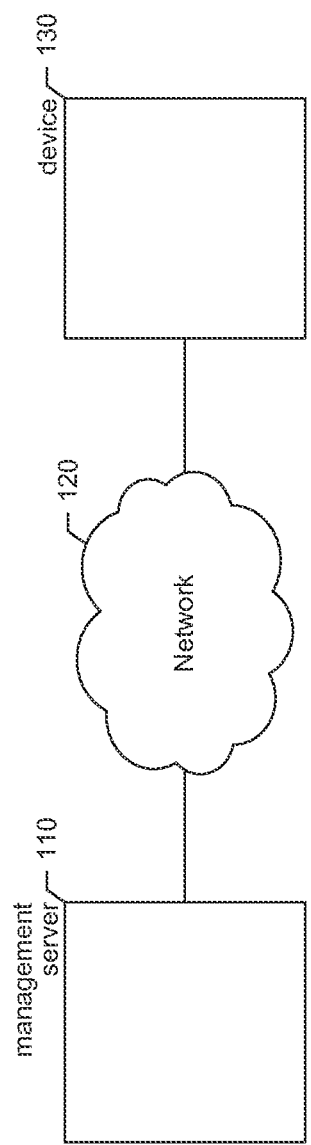
FIG. 1 is a network diagram showing an environment in which the facility operates in some examples.

In some examples, a facility maintains the state of a managed device. The facility receives an indication that the managed device is to be unenrolled from management. In response to receiving the indication, during a first time period, the facility performs a first unenrollment task with respect to the managed device. In response to receiving indication, during a second time period that does not intersect the first time period, performing a second unenrollment task with respect to the managed device that is distinct from the first unenrollment task.

DETAILED DESCRIPTION

The inventors have recognized that conventional approaches to unenrolling devices from a device management system have significant disadvantages. In particular, in many conventional approaches, the device management system attempts to simultaneously remove all resources identified for removal. Because different resources turn out to have different requirements for removal, in some cases, a device management system attempts simultaneous removal of all resources at a time before the requirements for removing all of the resources are met. In some such cases, conventional device management systems fail to remove any of the resources.

In some cases, conventional device management systems wait to attempt to remove any resources until conditions for removal of all the resources are met. In cases where this is possible, this approach often misses opportunities to earlier remove certain resources whose conditions for removal were earlier satisfied. In other cases, however, two different resources may have mutually exclusive conditions for removal, which may prevent the device management system from ever attempting resource removal.

In order to address these shortcomings, the inventors have conceived and reduced to practice a software and/or hardware facility for performing device unenrollment by removing resources in multiple phases ("the facility"). In various examples, the resources removed by the facility can include, for example, files, settings, policies, registry entries or subtrees, user preferences, user credentials, encryption keys, network credentials, identity trust relationships, applications, device drivers, and other assets.

The facility employs a list of resource removal tasks to complete for the device. In some examples, the order of tasks in the list specifies the order in which the tasks are attempted by the facility.

In some examples, the list specifies, for at least some of the tasks, one or more conditions that are to be satisfied before the facility attempts the task. Such conditions may correspond to conditions that are necessary for performance of a task—such as deleting data that is only accessible while the user of the device is logged in—and/or to conditions that are preferred for performance of a task—such as not uninstalling an application while the application is running. In such examples, the facility monitors for the satisfaction of these conditions—and/or hooks code associated with the satisfaction of these conditions—to be able to attempt each such task upon the conditions' satisfaction.

In some examples, for each task attempted, the facility determines whether the task was successfully completed, and only if so, marks the task as completed. In some examples, the facility continues to re-attempt each task not marked as completed until it is marked as completed. This includes, in some examples, automatically restarting the facility on device startup and/or periodically in order to resume the processing of unenrollment processes interrupted by, e.g., device restart, process termination, etc.

By performing in some or all of these ways, the facility facilitates automatic, complete, prompt device unenrollments that are capable of respecting selected device usability criteria.

FIG. 1 is a network diagram showing an environment in which the facility operates in some examples. A management server 110 communicates via a network 120 such as the Internet with a device 130 under management to unenroll this device from management by removing particular resources from the device. In some examples, the management server sends an initial trigger to the device to initiate unenrollment. The trigger explicitly or implicitly references a list of the resource removal tasks to be performed; this list may be included with the trigger. In some examples, the device coordinates the unenrollment, and notifies the management server of its ultimate completion, and/or progress toward that goal. In some examples, the management server directs the unenrollment process at a finer level of detail, such as by initiating the attempt of each resource removal task. The device may be of virtually any type, including, for example, a server computer system, a desktop computer system, a laptop computer system, a netbook, a tablet computer system, a mobile phone, a personal digital assistant, a television, a camera, an automobile computer, an electronic media player, etc. The facility may perform unenrollment for any number of devices simultaneously.

Figure 2:
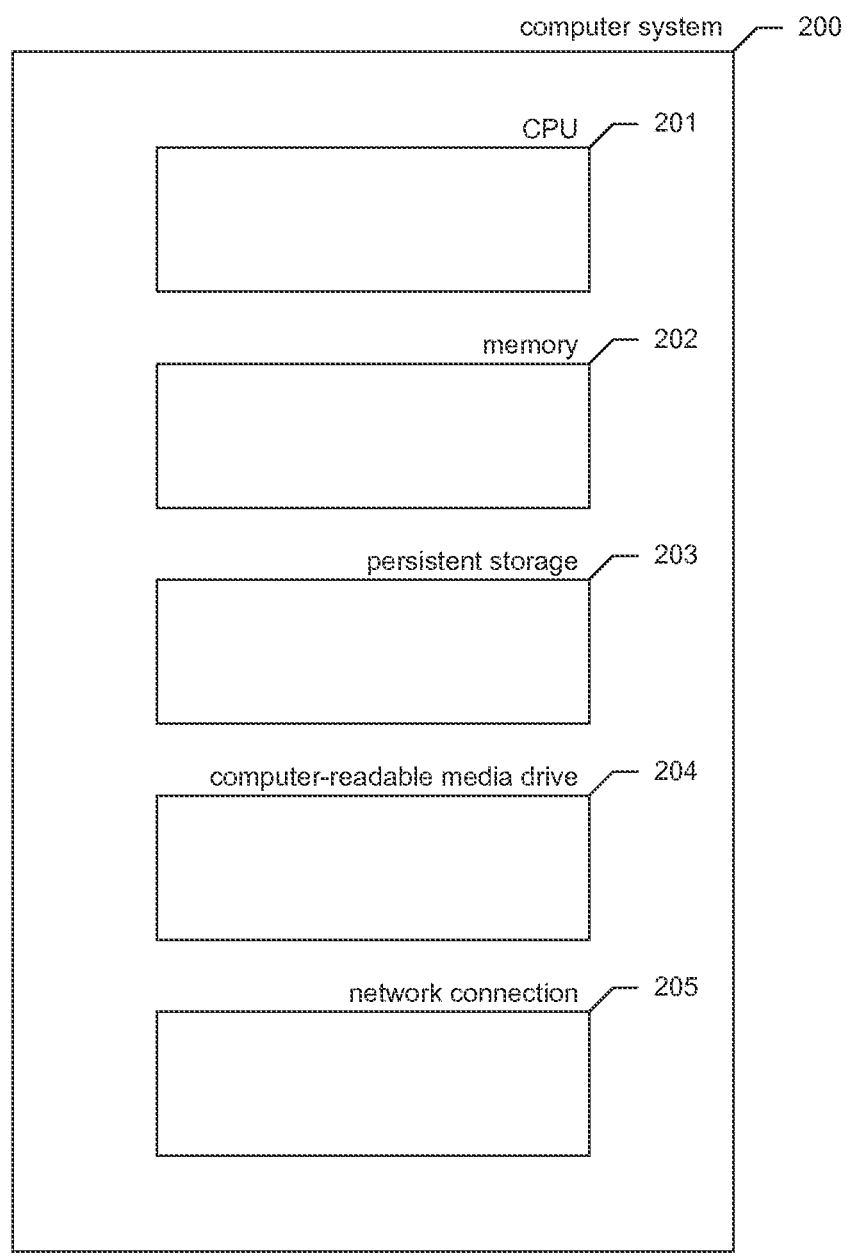
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various examples, these computer systems and other devices 200 can include server computer systems, desktop computer systems, laptop computer systems, netbooks, tablet computer systems, mobile phones, personal digital assistants, televisions, cameras, automobile computers, electronic media players, etc. In various examples, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 3:
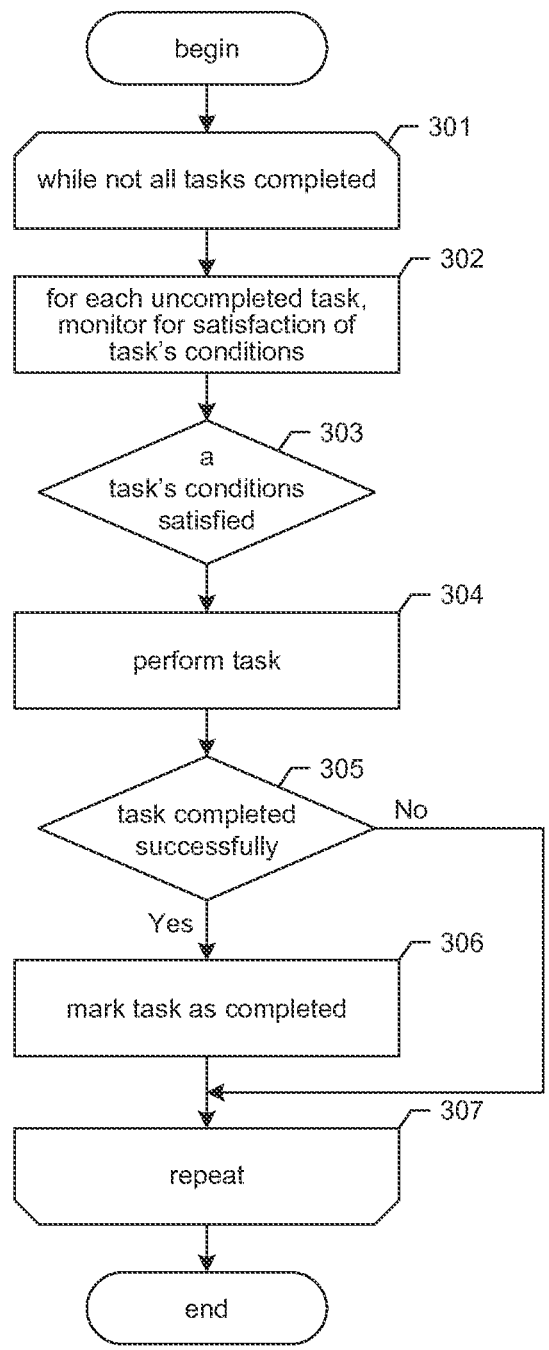
FIG. 3 is a flow diagram showing example acts that may be performed by the facility in some examples to unenroll a device from management according to a first approach.

FIG. 3 is a flow diagram showing example acts that may be performed by the facility in some examples to unenroll a device from management according to a first approach. In various examples, these acts are distributed in different ways between the management server and the device. The facility repeats block 301-307 while not all of the resource removal tasks specified for the device are completed.

Figure 4:
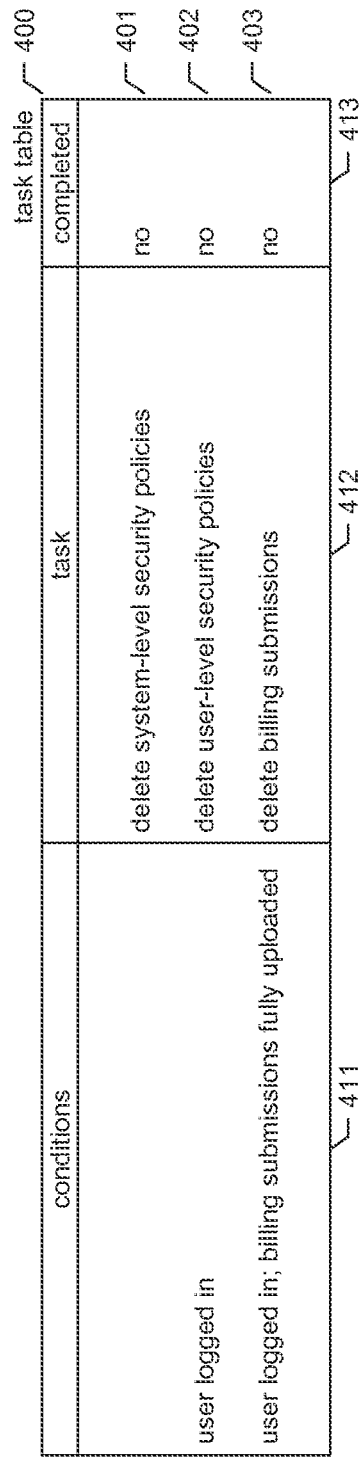
FIG. 4 is a table diagram showing sample contents of a task table data structure used by the facility in some examples to specify the resource removal tasks to be performed as part of unenrolling a particular device from management as part of the first approach.

FIG. 4 is a table diagram showing sample contents of a task table data structure used by the facility in some examples to specify the resource removal tasks to be performed as part of unenrolling a particular device from management as part of the first approach. The task table 400 is made up of rows 401-403, each corresponding to a different task. Each of these rows is divided into the following columns: a conditions column 411 indicating, at least in some rows, conditions that are to be satisfied before performance of the task to which the row corresponds is to be attempted; a task column 412 indicating the task to be performed; and a completed column 413 indicating whether the task to which the row corresponds has been successfully completed. Here, it can be seen that none of the tasks to which rows 401-403 correspond has been successfully completed; that the task to which row 401 corresponds has no conditions, and involves deleting system-level security policies; that the task to which row 402 corresponds has the condition that the user is logged in, and involves deleting user-level security policies that are only accessible for deletion when the user is logged in, and that the task to which row 403 corresponds has two conditions—that the user is logged in, and that the user's billing submissions are fully uploaded to the organization's server—and involves deleting billing submissions. In some examples (not shown), a task's conditions may include successful completion of another task.

While FIG. 4 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; etc.

Returning to FIG. 3, at 302, for each uncompleted task—i.e., each task whose row in the task table that contains a positive indication in the completed column—the facility monitors for satisfaction of the task's conditions. In various embodiments, at 302, the facility uses various approaches to monitoring for satisfaction of the task's conditions, including registering or otherwise watching for events corresponding to satisfaction of the task's conditions, hooking code involved in satisfying the task's conditions, etc. At 303, when a task's conditions are satisfied (or where no conditions are specified for a task), the facility continues at 304. At 304, the facility performs the task. In various examples, the task table contains various information (not shown) to facilitate automatic performance of the task, including API or other function names to call, entry points to call, parameters to pass, registry manipulation commands, macros, or commands of other types, etc. (not shown). At 305, if the task performed at 304 completed successfully, then the facility continues at 306, else the facility continues at 307. At 306, the facility marks the task as completed.

FIG. 5 is a table diagram showing sample contents of the task table shown in FIG. 4 at a later point in time. It can be seen in task table 500 that, at the intersection of row 501 and completed column 513, the step to which row 501 corresponds is marked as completed.

Returning to FIG. 3, at 307, if not all of the tasks are marked as completed, the facility continues performance of block 301-307, else these acts conclude.

Those skilled in the art will appreciate that the steps shown in FIG. 3 and in each of the flow diagrams discussed below may be altered in a variety of ways. For example, the order of the steps may be rearranged; some steps may be performed in parallel; shown steps may be omitted, or other steps may be included; a shown step may divided into substeps, or multiple shown steps may be combined into a single step, etc.

Figure 6:
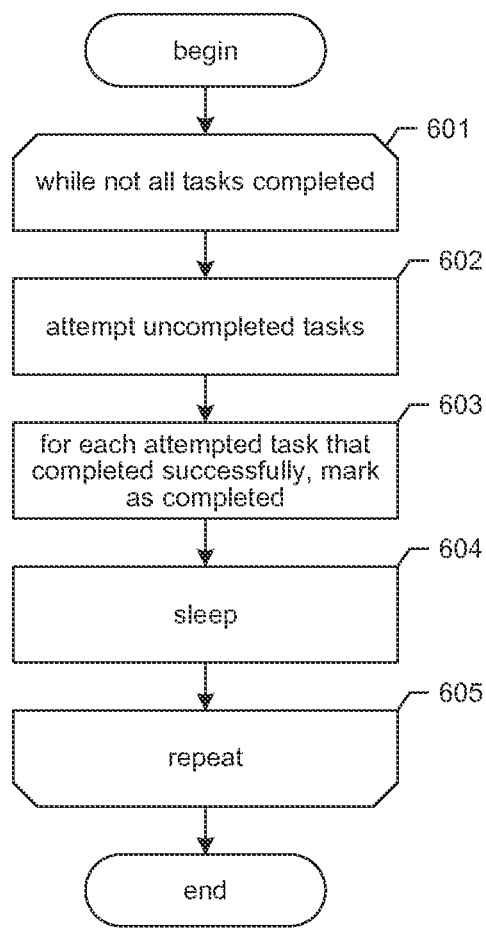
FIG. 6 is a flow diagram showing example acts that may be performed by the facility in some examples to unenroll a device from management according to a second approach.

FIG. 6 is a flow diagram showing example acts that may be performed by the facility in some examples to unenroll a device from management according to a second approach. In various examples, these acts are distributed in different ways between the management server and the device. The facility repeats block 601-605 while not all of the resource removal tasks specified for the device are completed.

FIG. 7 is a table diagram showing sample contents of a task table used in some examples by the facility to specify the resource removal tasks to be performed as part of unenrolling a particular device from management as part of the second approach. The table 700 is made up of rows 701-703 each corresponding to a different task, and each divided into the following columns: a task column 711 indicating the task to be performed, and a completed column 712 indicating whether the task has been successfully completed. For example, it can be seen from row 701 that the task "uninstall application A" has not yet been successfully completed.

Returning to FIG. 6, in step 602, the facility attempts all of the tasks not marked as completed in the task table. In the example depicted in FIG. 7, the facility attempts all of the tasks in the task table, corresponding to rows 701-703. In some examples, the facility attempts the uncompleted tasks at 602 in the order in which they occur in the task table. At 603, for each task attempted in step 602 that completed successfully, the facility marks it as completed by changing the indication in the corresponding row the task table, in the completed column, from "no" to "yes."

FIG. 8 is a table diagram showing sample contents of the task table shown in FIG. 7 at a later point in time. It can be seen from changes to the indications in the completed column that the tasks to which rows 801 and 803 correspond have been successfully completed based upon their first attempt, while the task corresponding to row 802 has not been completed based upon its first attempt and will be attempted again.

Returning to FIG. 6, at 604, the facility waits for a period of time. In various examples, this period of time may be a fraction of a second, a second, a minute, an hour, six hours, a day, a number of days, etc. At 605, if not all tasks have been completed, then the facility continues performing block 601-605, else these acts conclude.

In some embodiments, the facility distinguishes between critical and non-critical tasks. In some such examples, where one of a group of tasks to be performed in a specified order is a non-critical task, even where the task cannot be completed successfully, the facility proceeds to the next task. In some such examples, the failed task is asynchronistically retried. Where a task is critical, however, the facility causes the device to reboot and repeats its attempt to perform the critical task, without immediately moving on to the next task in the sequence.

In some examples, the facility performs method in a managed device to unenroll a selected device from management. The method comprises: accessing a set of unenrollment tasks that are to be performed on the selected device in order to unenroll the selected device from management; marking all of the unenrollment tasks of the accessed set as not completed; and, after the marking of all of the unenrollment tasks of the accessed set as not completed, for each of the unenrollment tasks of the accessed set, attempting the unenrollment task until the unenrollment task is marked as completed, wherein attempting the unenrollment task in turn comprises: invoking the unenrollment task, determining whether invocation of the unenrollment task was successful, and only if it is determined that invocation of the unenrollment task was successful, marking the unenrollment task as completed.

In some examples, the facility provides a computer-readable medium containing a device unenrollment data structure, the data structure comprising: a plurality of entries, each entry in turn comprising: information identifying a device unenrollment task to be performed as part of a process of on enrolling a selected device from a device management service; and information indicating whether the identified device unenrollment task has been successfully performed with respect to the selected device, such that the contents of the data structure are usable to identify device unenrollment tasks that remain to be performed with respect to the selected device.

In some examples, the facility provides a computer-readable medium having contents configured to cause a computing system to maintain the state of a managed device by performing a process comprising: receiving an indication that the managed device is to be unenrolled from management; and, in response to receiving the indication: during a first time period, performing a first unenrollment task with respect to the managed device, and during a second time period that does not intersect the first time period, performing a second unenrollment task with respect to the managed device, the second unenrollment task being distinct from the first unenrollment task.

It will be appreciated by those skilled in the art that the above-described facility may be straightforwardly adapted or extended in various ways. While the foregoing description makes reference to particular examples, the scope of the invention is defined solely by the claims that follow and the elements recited therein.

We claim:

1. A method in a selected device to unenroll the selected device from management, comprising:
   receiving an unenrollment trigger;
   in response for receiving the unenrollment trigger:
      accessing a set of unenrollment tasks that are to be performed on the selected device in order to unenroll the selected device from management;
      marking all of the unenrollment tasks of the accessed set as not completed;
      after the marking of all of the unenrollment tasks of the accessed set as not completed, for each of the unenrollment tasks of the accessed set, attempting the unenrollment task until the unenrollment task is marked as completed, wherein attempting the unenrollment task comprises:
         invoking the unenrollment task;
         determining whether invocation of the unenrollment task was successful; and only if it is determined that invocation of the unenrollment task was successful, marking the unenrollment task as completed, wherein a condition is associated with a selected one or more of the unenrollment tasks of the accessed set, and wherein each of the selected unenrollment task is attempted only after the associated condition is determined to be satisfied, and wherein, for a distinguished one of the unenrollment tasks of the accessed set, attempting the unenrollment task further comprises invoking the unenrollment task after interruption of full function of the selected device during a previous attempt of the distinguished unenrollment task.

2. The method of claim 1 wherein at least a portion of the unenrollment tasks of the accessed set involve removing resources from the selected device.

3. The method of claim 1 wherein at least a portion of the unenrollment tasks of the accessed set involve altering configuration of the selected device.

4. The method of claim 1 wherein at least a portion of the unenrollment tasks of the accessed set involve deleting data stored by the selected device.

5. The method of claim 1 wherein the accessed set of unenrollment tasks is an ordered list, and wherein the unenrollment tasks are attempted in an order established by the ordered list.

6. The method of claim 1, further comprising, in response to determining that all of the unenrollment tasks of the set are marked as completed, notifying a device management server that unenrollment of the selected device is complete.

7. The method of claim 1 wherein the method is performed by a device management agent executing on the selected device.

8. A memory containing a device unenrollment data structure, the data structure comprising:
  a plurality of entries, each entry comprising:
    information identifying a device unenrollment task to be performed as part of a process of unenrolling a selected device from a device management service; and
    information indicating whether the identified device unenrollment task has been successfully performed with respect to the selected device, and
    information specifying a condition that is to be satisfied before the identified device unenrollment task is performed, wherein a different condition is specified for each of one or more entries of the plurality of entries,
the data structure having been initialized in response to receiving an unenrollment trigger by marking corresponding information of all of the entries to indicate that the identified device unenrollment tasks of all of the entries as being not successfully performed with respect to the selected device, after initialization, the data structure being usable to, for each entry, attempt associated device unenrollment task of the entry until corresponding information of the entry indicates successful performance of the associated device unenrollment task; where the corresponding information of the entry is marked to indicate that the associated device unenrollment task has been successfully performed only if it is determined that invocation of the associated device unenrollment task was successful even after full operation of the selected device has been interrupted during a previous attempt of the associated device unenrollment task.

9. The memory of claim 8 wherein, for each of at least a portion of the plurality of entries, the information identifying a device unenrollment task identifies code that is to be executed to perform the identified device unenrollment task.

10. The memory of claim 8 wherein, for each of at least a portion of the plurality of entries, the information identifying a device unenrollment task identifies a command that is to be issued to perform the identified device unenrollment task.

11. The memory of claim 8 wherein, for each of at least a portion of the plurality of entries, the information identifying a device unenrollment task identifies state of the device that is to be deleted to perform the identified device unenrollment task.

12. The memory of claim 8 wherein the computer-readable medium is available for direct access by the selected device.

13. The memory of claim 8 wherein the computer-readable medium is available for direct access by a computer system distinct from the selected device.

14. A memory having contents configured to cause a computing system to maintain the state of a managed device by performing a process comprising:
  receiving a trigger indicating that the managed device is to be unenrolled from management;
  in response to receiving the trigger:
    during a first time period, attempting a first unenrollment task with respect to the managed device; and
    during a second time period that does not intersect the first time period:
      reattempting the first unenrollment task with respect to the managed device when an interruption of full operation of the managed device occurs during the attempt of the first unenrollment task during the first time period; and
      performing a second unenrollment task with respect to the managed device, the second unenrollment task being distinct from the first unenrollment task,
wherein a first contingency is associated with the second enrollment task and a second contingency is associated with a third enrollment task,
the process further comprising determining during the second time period that the contingency is satisfied,
and wherein the second unenrollment task is performed during the second time period in response to determining during the second time that the contingency is satisfied.

15. The memory of claim 14 wherein the first and second unenrollment tasks are performed on the managed device.

16. The memory of claim 14, the process further comprising determining during the first time period that the contingency is not satisfied,
  and wherein the second unenrollment task is not performed during the first time period in response to determining during the first time that the contingency is not satisfied.

17. The memory of claim 15, the process further comprising, at a time after performance of both the first and second unenrollment tasks, causing a transmission indicating performance of the first and second unenrollment tasks addressed to a computer system other than the managed device to be sent from the managed device.

18. A device under management, comprising:
  a processor;
  a communications subsystem executing on the processor that is configured to receive a trigger indicating that the managed device is to be unenrolled from management; and
  an unenrollment subsystem executing on the processor that is configured to, in response to receipt of the trigger by the communications subsystem:

during a first time period, attempt a first unenrollment task with respect to the device;

during a second time period that does not intersect the first time period:

reattempt the first unenrollment task with respect to the device when an interruption of full operation of the managed device occurs during the attempt of the first unenrollment task during the first time period; and perform a second unenrollment task with respect to the device, the second unenrollment task being distinct from the first unenrollment task, wherein a first contingency is associated with the second enrollment task and a second contingency is associated with a third enrollment task, the process further comprising determining during the second time period that the contingency is satisfied, and wherein the second unenrollment task is performed during the second time period in response to determining during the second time that the contingency is satisfied.

19. The device of claim 18 wherein the unenrollment subsystem is further configured to determine during the first time period that the contingency is not satisfied, and wherein the second unenrollment task is not performed by the unenrollment subsystem during the first time period in response to determining during the first time that the contingency is not satisfied.

20. The device of claim 18 wherein the first unenrollment task involves an action selected from among (1) removing resources from the selected device, (2) altering configuration of the selected device, and (3) deleting data stored by the selected device, and wherein the second unenrollment task involves an action selected from among (1) removing resources from the selected device, (2) altering configuration of the selected device, and (3) deleting data stored by the selected device.

21. The device of claim 18 wherein the unenrollment subsystem performs the first unenrollment task using a technique selected from among (1) executing code, (2) issuing a command, and (3) deleting a state, and wherein the unenrollment subsystem performs the second unenrollment task using a technique selected from among (1) executing code, (2) issuing a command, and (3) deleting a state.

\* \* \* \* \*